United States Patent [19]

Elberbaum

[11] Patent Number: 4,954,886

[45] Date of Patent: Sep. 4, 1990

[54] CLOSED CIRCUIT TELEVISION APPARATUS WITH A REMOTE CONTROL TELEVISION CAMERA

[75] Inventor: David Elberbaum, Tokyo, Japan

[73] Assignee: Elbex Video, Ltd., Tokyo, Japan

[21] Appl. No.: 270,576

[22] Filed: Nov. 14, 1988

[30] Foreign Application Priority Data

Mar. 17, 1988 [JP] Japan .................................. 63-62042

[51] Int. Cl.$^5$ .......................... H04N 7/10; H04N 7/18
[52] U.S. Cl. ...................................... 358/86; 358/108; 358/210; 379/102
[58] Field of Search .................... 358/85, 86, 108, 210, 358/181; 379/102, 104, 105; 455/4, 5

[56] References Cited

U.S. PATENT DOCUMENTS 4,148,069  4/1979  Smiley et al. ..................... 358/185 X
4,326,221  4/1982  Mallos et al. ........................ 358/210

Primary Examiner—Howard W. Britton
Assistant Examiner—Victor R. Kostak
Attorney, Agent, or Firm—Helfgott & Karas

[57] ABSTRACT

A closed circuit television apparatus comprises a remote-controllable television camera including an image pick-up device for generating a video signal, a plurality of controlling devices each having an operating circuit for generating a plurality of control signals to control the television camera, and a displaying device which receives the video signal and displays a picture or image corresponding to the received video signal, and a distributing device which connects the displaying devices of the respective controlling devices to the television camera for distributing the video signal from the television camera to the controlling devices. Each operating circuit outputs a modulated control signal of a carrier frequency higher than the frequency of the video signal, to a circuit portion connecting the distributing device to the displaying devices. The television camera also includes a driving circuit which receives the control signals, extract a separated control signal, demodulates and decodes the extracted signal and operates the television camera based on the decoded control signal.

10 Claims, 3 Drawing Sheets

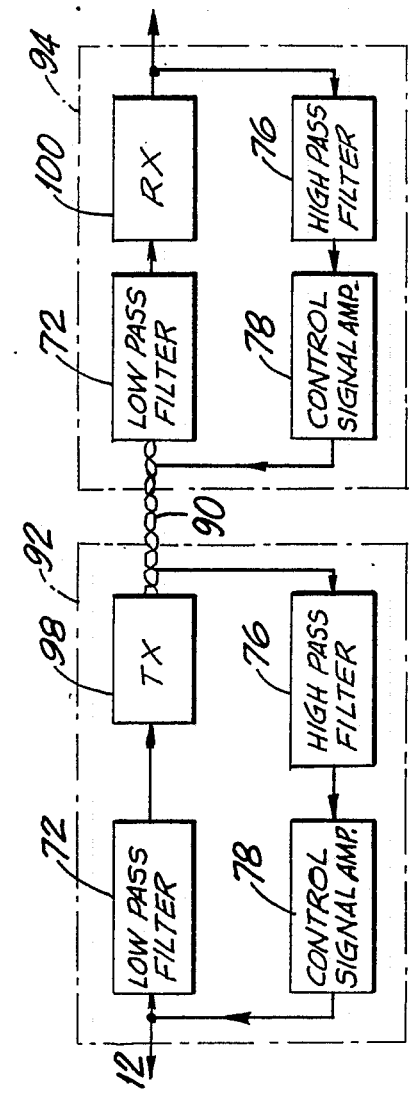
FIG.4
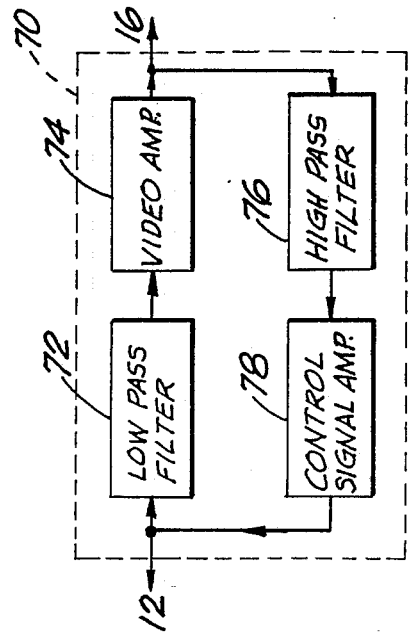
FIG.6
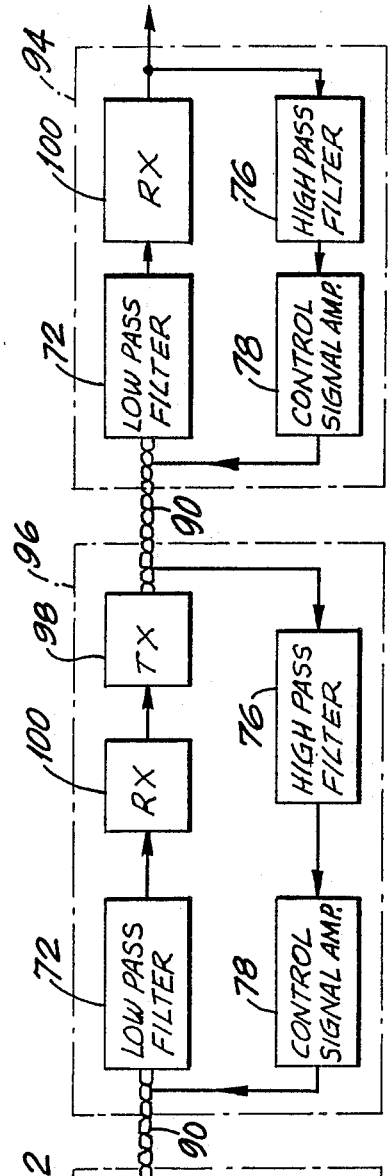
FIG.7
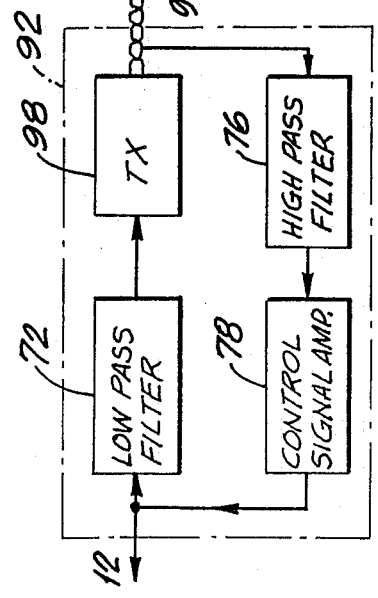

CLOSED CIRCUIT TELEVISION APPARATUS WITH A REMOTE CONTROL TELEVISION CAMERA

BACKGROUND OF THE INVENTION

1. Field of the Invention:

This invention relates to a closed circuit television apparatus for a supervisory system, and more particularly to a closed circuit television apparatus in which a television camera is remotely controllable.

2. Description of the Prior Art:

A closed circuit television apparatus of the type mentioned above is known in which one television camera is remote-controllable from a plurality of supervisory stations. In this apparatus, the remote-controllable television camera is located at a place to be observed. At each of the supervisory stations, a controlling device for remote controlling the operations of the television camera, such as make-and-break of a power, make-and-break of a wiper, and rotating the coordinates of the television camera, such as up-down (tilting), left-right (panning), far-near (focusing) and tele-wide (zooming) is located. Between the television camera and the controlling devices, a distributor is used for distributing a video signal from the television camera to the controlling devices. Each controlling device includes a control panel for generating a plurality of control signals to control the television camera, and a monitor for receiving the video signal from the television camera and for displaying a picture or image corresponding to the video signal.

A problem with this conventional closed circuit television apparatus is that since separate transmission lines are employed for transmitting the video signal generated by the camera and the control signals generated by the controlling devices, many cables must be built between the controlling devices and the television camera which is complex and expensive.

SUMMARY OF THE INVENTION

It is therefore an object of the present invention to provide a closed circuit television apparatus in which a video signal generated by the television camera and control signals generated by the controlling devices can be transmitted correctly through a common cable.

Another object of the present invention is to provide a closed circuit television apparatus in which the loss of the video signal in a transmission line is compensated Still another object of the present invention is to provide a closed circuit television apparatus in which each of the control signals can be transmitted through a telephone network.

According to a first aspect of the present invention, a closed circuit television apparatus comprises a remote-controllable television camera including an image pick-up device for generating a video signal, a plurality of controlling devices each including an operating means for generating a plurality of control signals to control the television camera, and a displaying means for receiving the video signal and for displaying a picture or image corresponding to the received video signal, and a distributing device connecting the displaying means of the respective controlling devices to the television cameras for distributing the video signal outputted from the television camera to the respective controlling devices. Each of the operating means generates the modulated control signals having a carrier frequency higher than the frequency of the video signal and outputs the control signals to a circuit portion connecting the distributing device to the displaying means. The television camera also includes a driving means for receiving the control signals, extracting the control signals, and operating the television cameras based on the extracted control signal.

In a preferred embodiment of the present invention, said operating means includes a circuit for generating a plurality of composite signals each composed of two signals having different frequencies commensurate with the kind of control, a circuit for generating a carrier signal having a frequency higher than the frequency of the video signal, and a circuit for modulating the carrier signal by the composite signal. The driving means includes a filter for extracting the modulated carrier signal outputted from the driving means, a decoder for demodulating the composite signal from the extracted signal and for outputting a signal corresponding to the demodulated signal, a driver for actuating the television camera, and a controller for controlling the driver based on the output signal of the decoder.

The distributing device includes a main circuit portion connected to a transmission line, a plurality of branching circuit portions branching off from the main circuit portion and connected to said displaying means individually, at least one of processing circuits which is disposed in the main circuit portion or in each of the branching circuit portions, so that input and output terminals of said processing circuit are disposed at the television camera side and the controlling device side, respectively, and which outputs the video signal and does not output the control signals, and a plurality of bypass circuits connecting across the main circuit portion and the branching circuit portions so as to bypass the processing circuit, so that input and output terminals of the bypass circuits are disposed at each of the television camera side and the controlling means side, respectively, and which output the control signals and does not output the video signal.

In each of the main circuit portion and the branching circuit portions, the processing circuit is disposed respectively.

The processing circuit includes a video signal amplifier which responds to the video signal and does not respond to the control signals and each of the bypass circuits includes a filter which allows the control signals to pass and prevents the video signal from passing.

The processing circuit includes a filter which allows the video signal to pass and prevents the control signals from passing, and an amplifier for amplifying the output signal of said filter, and each of the bypass circuits includes a filter which allows the control signals to pass and prevents the video signal from passing, and an amplifier for amplifying the output signal of said filter.

According to a second aspect of the present invention, a closed circuit television apparatus comprises a remote-controllable television camera including an image pick-up device for generating a video signal, a controlling device including an operating means for generating a plurality of control signals to control said television camera, and a displaying means for receiving the video signal and for displaying a picture corresponding to the received video signal, and a compensating device disposed at a transmission line for connecting said displaying means of the controlling devices to the television camera so as to compensate the loss of the video signal, outputted from said television camera to the respective controlling devices.

The operating means is adapted to generate modulated control signals having a carrier frequency higher than the frequency of the video signal, and to output the control signals to a circuit portion connecting said transmission line device to said displaying means.

The television camera further includes a driving means for receiving the control signals, extracting the control signals, and operating the television camera based on the extracted control signal.

The compensating device includes a video signal amplifier which responds to the video signal and does not respond to the control signals, and a bypass circuit across the video signal amplifier includes a high-pass filter which allows the control signals to pass and prevents the video signal from passing.

In a preferred embodiment of the present invention, the compensating device further includes a low-pass filter which allows the video signal to pass to the video signal amplifier and prevents the control signal from passing, and wherein the bypass circuit further includes a control signal amplifier for amplifying the output signal of said high-pass filter.

The video signal amplifier may be a transmitter for transmitting the output signal of said low-pass filter.

The video signal amplifier may be a receiver for receiving the output signal of said low-pass filter.

The video signal amplifier may be a relay for relaying the output signal of said low-pass filter.

According to a third aspect of the present invention, a closed circuit television apparatus comprises a remote-controllable television camera including an image pick-up device for generating a video signal, a control device including an operating means for generating a plurality of control signals to control said television camera through a telephone network, and a displaying means for receiving the video signal and for displaying a picture corresponding to the received video signal, and a signal processing device connecting the transmission line of the television camera to the telephone network to transfer to the television camera the control signals generated by the operating means.

The operating means includes a circuit for generating said control signals consisting of a composite signal each composed of two signals having different frequencies commensurate with the kind of control, and for sending the composite signal to the television camera through the telephone network.

The signal processing device includes an interface connected to the telephone network to receive the control signals, a circuit for decoding the control signals received by the interface and for generating a composite signal composed of two signals having different frequencies commensurate with the decoded control signals, a circuit for generating a carrier signal having a frequency higher than the frequency of the video signal, and a circuit for modulating the carrier signal by the composite signal, and outputting the modulated carrier signal to the transmission line of the television camera.

The operating means may be provided with a known "dual tone" telephone apparatus.

The video signal generated by the television camera is supplied to the each controlling device via the distributing device, thereby reproducing on the displaying means of the controlling device the picture or image corresponding to the received video signal.

Meanwhile, the control signals generated by the operating means is transmitted to the television camera via the distributing device and the transmission line in reverse direction to the video signal, thereby controlling at least one of the operational functions of the television camera, such as make-and-break of a power, make-and-break of a wiper, or rotating at least one of the tilting, panning, focusing or zooming coordinates.

With this apparatus, partly because the frequency of each control signal, transmitted from the each controlling device to the television camera is higher than the frequency of the video signal generated by the television camera, and partly because the distributing device for distributing the video signal from the television camera to the respective controlling device is disposed between the television camera and the controlling devices, the control signals generated by each controlling device and the video signal generated by the television camera can be transmitted correctly through a common transmission line.

The video signal generated by the image pick-up device does not pass the bypass circuits of the distributing device, while each control signal generated by the operating means does not pass the processing circuit of the distributing device.

Since the video signal is transmitted to the each controlling device via the distributing device while the control signals are transmitted to the television camera via the distributing device, the video signal and the control signals, the transmitting directions of which are opposite to each other, can be transmitted correctly via a common transmission line.

BRIEF DESCRIPTION OF THE DRAWINGS

The foregoing and other objects and features of the invention will become apparent from the following description of preferred embodiments of the invention with reference to the accompanying drawings, in which:

FIG. 4 is a block diagram showing an embodiment of a line amplifier circuit including the bypass circuit;

FIG. 6 is a block diagram showing an embodiment of a twin wire line circuit including the bypass circuit; and FIG. 7 is a block diagram showing an embodiment of an expanded twin wire line circuit including the bypass circuit.

DETAILED DESCRIPTION OF THE PREFERRED EMBODIMENTS

Figure 1:
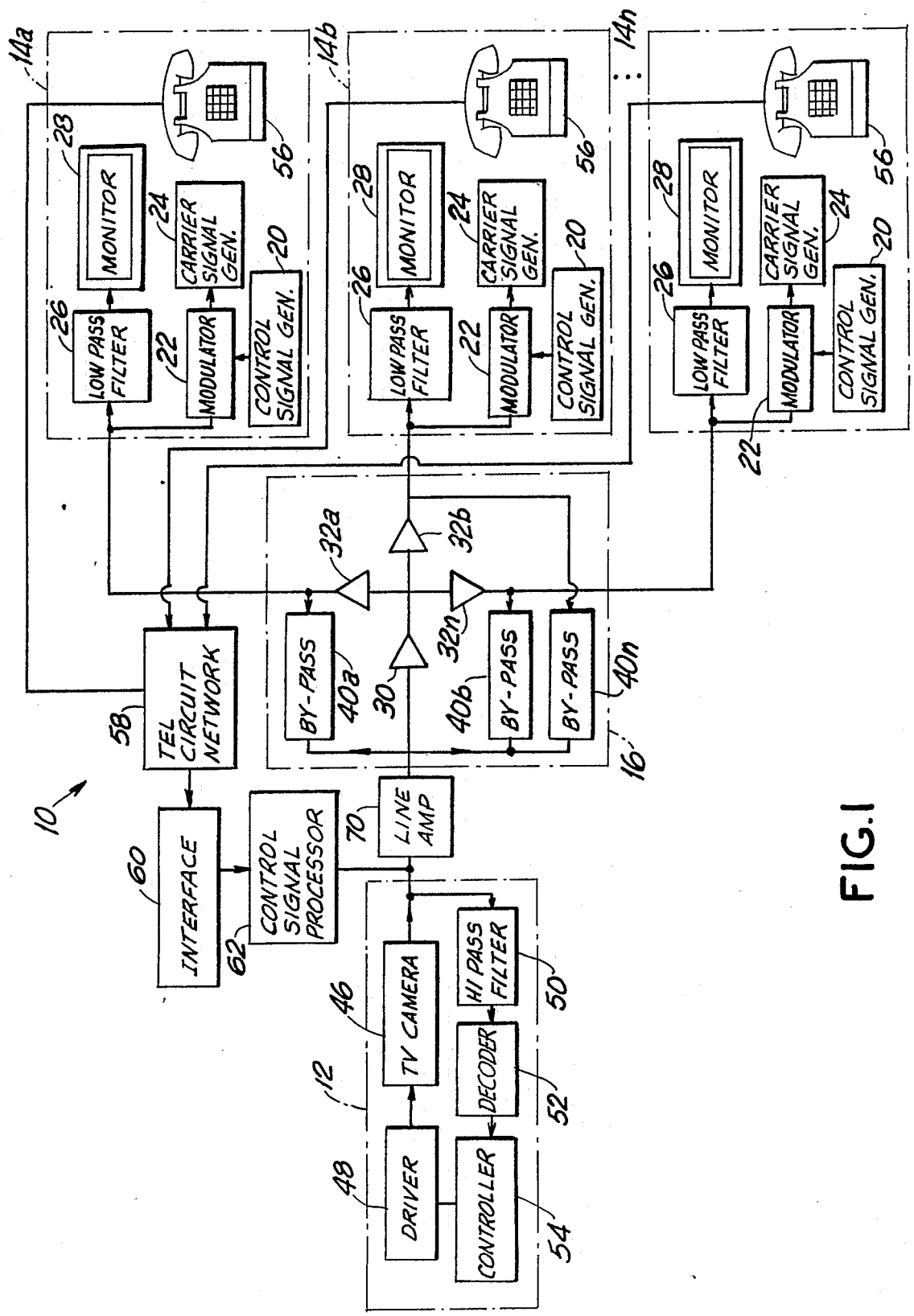
FIG. 1 is a block diagram of an electrical circuit showing an embodiment of a closed circuit television apparatus according to the present invention.

FIG. 1 shows a closed circuit television apparatus 10, in which a television camera 12 including an image pick-up device 46 for generating a video signal is located at a place to be observed. At a plurality of supervisory stations, a plurality of controlling devices 14a, 14b . . . 14n are located respectively to control the television camera 12. Between the television camera 12 and the controlling devices 14a, 14b . . . 14n, a distributing device 16 is located for distributing the video signal, transmitted from the television camera 12, to each of the controlling devices 14a, 14b . . . 14n. Between the respective supervisory stations and the place to be observed, a transmission line 18 comprising a cable connecting the television camera 12 to the distributing device 16 is built.

The video signal is a composite signal which is composed by adding a composite synchronizing signal, etc. to a picture signal.

Each of the controlling devices 14a, 14b . . . 14n includes a circuit 20 for generating various kinds of signals to control the operational functions of the television camera. Each control signal has frequencies corresponding to various kinds of controls or commands so as to control the operational functions of the television camera, such as make-and-break of a power, make-and-break of a wiper, and rotate the coordinates of the television camera such as up-down (tilting), left-right (panning), far-near (focusing) and tele-wide (zooming). Each of the commands is allotted with a code. The codes "1", "2", "3" and "4", for example, are allotted to the power-on command, power-off command, wiper on command and wiper-off command, respectively. Each code is composed of one or more figures.

Each control signal generating circuit 20 includes a push-button-type telephone apparatus or a tone encoder (put on the market under the name such as "dual tone encoder").

Each code is inputted every figure by depressing buttons of the push-button-type telephone apparatus or buttons connected to the tone encoder If the code is composed of a single figure, a composite signal of two signals having different frequencies specified by the code is outputted from the circuit 20 as the control signal. If the code is composed of more than one figure, the composite signal for each figure of the code is outputted from the circuit 20 as the control signal Each composite signal is composed of one of four signals having different frequencies f1, f2, f3, f4 and one of other four signals having different frequencies f5, f6, f7, f8.

The control signal generating circuit 20 may include a plurality of other switches as a substitute for the push-button switch of the tone encoder, in this case each of the control signals is a composite signal of two kinds of signals commensurate with the number of codes.

The control signal generating circuit 20 may also include a setting circuit for setting a plurality of command codes, and a processing circuit for generating a plurality of control signals each having a frequency corresponding to the code set by the setting circuit as a substitute for the telephone apparatus or the tone encoder. This setting circuit may employ a key-pad, a plurality of switches, a joy stick or the like. Otherwise the setting circuit may be a remote-controlling device of radio or infrared system. The processing circuit may employ a "dual tone" encoder or a computer serial coder.

The control signal generated by the control signal generating circuit 20 is supplied to a modulating circuit 22 which modulates the frequency of carrier signal, supplied from a carrier signal generating circuit 24, by the control signal. The carrier signal generated by the circuit 24 has the constant frequency adequately higher than the maximum frequency of the video signal transmitted from the television camera 12 to each of the controlling devices 14a, 14b . . . 14n.

The carrier signal may be signals having different frequencies for each of the controlling devices 14a, 14b . . . 14n, respectively. Each control signal may be single kind of signal or a composite signal of more than two signals having different frequencies corresponding to the code.

The modulated carrier signal is transmitted to the television camera 12 from the circuit portion which receives the video signal distributed by the distributing device 16. The frequency range of the modulated carrier signal is higher than the maximum frequency of the video signal transmitted from the television camera 12 to the controlling devices 14a, 14b . . . 14n.

The video signal transmitted to each of the controlling devices 14a, 14b . . . 14n is supplied to a television receiver or monitor 28 via a low-pass filter 26 which allows the received video signal to pass and prevents the carrier signal from passing. Consequently, since the carrier signal in the output signal of the filter 26 is eliminated by the filter 26, and though a common transmission line 18 is employed for the transmission of the video signal and the modulated carrier signal, a picture or image reproduced on the monitor 28 is not affected by the carrier signal.

The distributing device 16 includes a 1signal processing circuit or main amplifier 30 having an input terminal connected to the transmission line 18, and a plurality of 2nd signal processing circuits or branching amplifiers 32a, 32b . . . 32n branching off from output of the main amplifier 30 and connected to the controlling devices 14a, 14b . . . 14n individually.

Each of the input terminals of the branching amplifiers 32a, 32b . . . 32n is connected to the output of the main amplifier while their output terminals are disposed at the controlling device side. Each of the amplifiers 30, 32a, 32b . . . 32n outputs the video signal and does not output the carrier signal.

Figure 2:
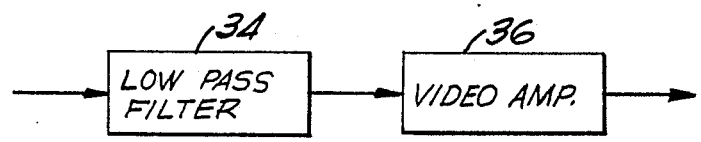
FIG. 2 is a block diagram showing an embodiment of a first signal processing circuit.

In the illustrated embodiment, each of the amplifier 30, 32a, 32b . . . 32n is a video signal amplifying circuit, employing a low-pass filter which allows the video signal to pass and prevents the carrier signal from passing. Alternatively, the main amplifier 30 may include, as shown in FIG. 2, a low-pass filter 34 which allows the video signal to pass and prevents the carrier signal from passing and an amplifier 36 for amplifying the output of the filter 34.

Figure 3:
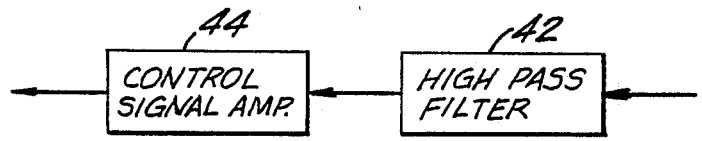
FIG. 3 is a block diagram showing an embodiment of a bypass circuit.

The distributing device 16 also includes a plurality of bypass circuits 40a, 40b . . . 40n independently corresponding to the branching amplifiers 32a, 32b . . . 32n. Each of the bypass circuits 40a, 40b . . . 40n is disposed so as to connect the input terminal of the main amplifier 30 to the output terminals of corresponded branching amplifiers 32a, 32b . . . 32n and so as to bypass the main amplifier 30 and the branching amplifiers 32a, 32b . . . 32n. Each of the bypass circuits 40a, 40b . . . 40n outputs the carrier signal and does not output the video signal. Each of the bypass circuits 40a, 40b . . . 40n is, in the illustrated embodiment, a high-pass filter which allows the carrier signal to pass and prevents the video signal from passing. Alternatively, each of the bypass circuits may include, as shown in FIG. 3, a high-pass filter 42 which allows the carrier signal to pass and prevents the video signal from passing, and an amplifier 44 for amplifying the output of the filter 42.

The television camera 12 includes an image pick-up device 46 which generates a video signal corresponding to the object and outputs the video signal to the transmission line 18. The operational functions of the television camera 12, such as make-and-break of a power, make-and-break of a wiper, rotating the coordinates of the tilting, panning, focusing and zooming, are driven by a driver 48.

The carrier signal transmitted by the controlling devices 14a, 14b . . . 14n to the television camera 12 is extracted by a high-pass filter or tuned circuit 50, which allows the carrier signal to pass, and are then supplied to a decoder 52 connected to the output side of the filter 50.

The decoder 52 demodulates the control signal from the carrier signal by a demodulating circuit (not shown), decodes the demodulated control signal by a known circuit (not shown) such as a "dual tone" decoder, and thereby supplies to a controller 54 signal corresponding to the command from the controlling device 14.

The controller 54 controls the driver 48 based on the signal supplied from the decoder 52. As a result, the operational functions of the television camera 12 are driven in accordance to the controls of the controlling device 14, such as make-and-break of a power, make-and-break of a wiper, tilting, panning, focusing and zooming.

If the distance between the supervisory station and the distributor is long, it is desirable to locate along the transmission line 18 one or more line amplifiers or compensating device 70 for compensation of a loss in the video signal and the control signals.

As shown in FIG. 4, the line amplifier 70 comprises a low-pass filter 72 which outputs only the video signal and blocks the control signals, a known non linear frequency compensator 74, such as a line booster/compensator, connected at its input terminal to an output terminal of the filter 72, a high-pass filter 76 which allows the control signals to pass and blocks the video signal, and a control signal amplifier 78 connected at its input terminal to an output terminal of the filter 76. The input terminal of the low-pass filter 72 and the output terminal of the control signal amplifier 78 are connected to the television camera 12 via the line 18.

The output terminal of the non linear amplifier 74 and the input terminal of the high-pass filter 78 are connected to the distributing device 16. Therefore, the video signal transmitted from the television camera 12 is transferred to the distributing device 16 through the filter 72 and the amplifier while the control signals are transferred to the television camera 12 through the filter 76 and amplifier 78.

Figure 5:
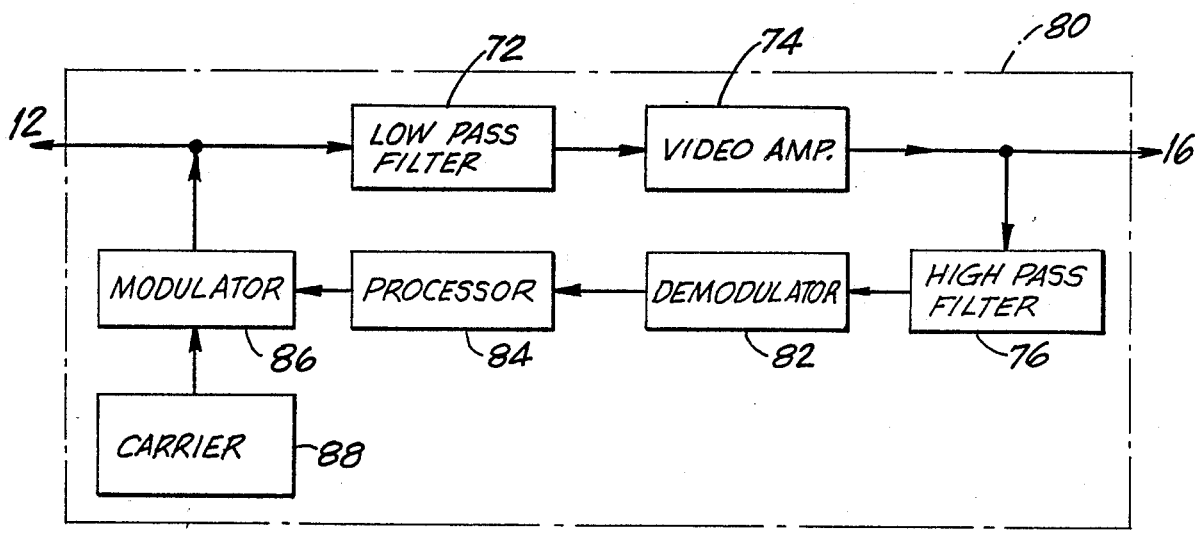
FIG. 5 is a block diagram showing an embodiment of a line amplifier including the bypass circuit and a control signal generating circuit.

Another line amplifier 80 is shown in FIG. 5. The line amplifier 80 also employs a demodulator/decoder circuit 82 with its input terminal connected to an output terminal of the high-pass filter 76. The demodulator/decoder 82 employs known frequency demodulation technique and known "dual-tone" decoders. The output signal of the decoder 82 is transmitted to the processing circuit 84 that generates newly control information identical to the original decoded signal or newly reprogrammed control information based on the signal inputted from the decoder 82. The signal of the processing circuit 84 is transmitted to a modulator 86, that modulates the frequency of the carrier signal generated by a carrier signal generator 88 connected to the modulator 86 by said control information. The carrier signal generated by the circuit 88 has the constant frequency adequately higher than the maximum frequency of the video signal transmitted from the television camera 12. The output terminal of the modulator 86 is connected to the junction of the transmission line 18 and the output terminal of the low-pass filter 72, thereby completing the transfer of the control signals from the output side of the line amplifier 80 to the television camera 12.

If the distance between the supervisory station and the distributor is long, a twin wire or telephone line may be used instead of the transmission line 18, in which case different line compensation system can be used. The twin wire line compensation employes a known line transmitter at the television camera side and a known line receiver at the distributor side or at the supervisory station side. Depending on the length of the line at one or places along the line a known relay apparatus, employing transmitter-receiver circuits are used.

An embodiment of FIG. 6 comprises two line amplifiers or compensating apparatuses 92 and 94 disposed in a twin wire transmission line 90. An embodiment of FIG. 7 comprises three line amplifiers or compensating apparatuses 92, 94 and 96 disposed in the line 90. The apparatus 92 employs a known video signal transmitter or line transmitter 98 instead of the amplifier 74 in the embodiment of FIG. 4. The apparatus 94 employs a known video signal receiver or line receiver 100 instead of the amplifier 74 in the embodiment of FIG. 4. The apparatus 96 employs the line receiver 100 and line transmitter 98 instead of the amplifier 74 in the embodiment of FIG. 4.

Alternatively, as shown in FIG. 1, each of the operating means including the control signal generating circuit 20, the modulating circuit 22 and the carrier signal generating circuit 24 may be replaced by a push-button-type telephone apparatus 56, in which case the control signal is transmitted from the telephone apparatus 56 via a telephone network 58. In this alternative arrangement, between the television camera 12 and the telephone network 58, an interface 60, connected to the telephone network 58 to receive the control signals, and a signal processing circuit 62 for generating a signal, similar to the modulated carrier signal generated from the operating means, based on the output signal of the interface 60. The signal processing circuit 62 includes a circuit for demodulating the control signal, generated from the telephone apparatus 56, based on the output signal of the interface 60, a circuit for generating a carrier signal identical with the carrier signal generated by the circuit 24 of the controlling device 14, and a circuit for modulating the frequencY of the carrier signal by the demodulated control signal.

This signal processing circuit 62 may be provided with the filter 76, the demodulator/decoder 82, the processing circuit 84, the modulator 86 and the carrier signal generator 88, shown in FIG. 5.

With the distributing device 16, the main amplifier 32 and the branching amplifiers, 32a, 32b . . . 32n prevent the control carrier signal from passing, while the bypass circuits 40a, 40b . . . 40n prevent the video signal from passing. Thus, the video signal transmitted from the television camera 12 to the distributing device 16 is transmitted to the respective controlling devices 14a, 14b . . . 14n correctly, while the control carrier signal transmitted from the respective controlling devices to the distributing device 16 is transmitted to the television camera 12 correctly.

What is claimed is:

1. A closed circuit television apparatus comprising:
   a remote-controllable television camera including an image pick-up device for generating a video signal;

a plurality of controlling devices each including an operating means for generating a plurality of control signals to control said television camera, and a displaying means for receiving the video signal and displaying a picture corresponding to the received video signal; and a distributing device for connecting said displaying means of the respective controlling devices to the television camera to distribute the video signal outputted from said television camera to the respective controlling devices;

said operating means including a circuit for generating a plurality of composite signals each composed of two signals having different frequencies commensurate with the kind of control, a circuit for generating a carrier signal having a frequency higher than the frequency of the video signal, and a circuit for modulating the carrier signal by the composite signal, and outputting the control signals to a circuit portion connecting said distributing device to said displaying means;

said television camera further including a driving means for receiving the control signals, said driving means including a filter for extracting a modulated carrier signal outputted from said driving means, a decoder for demodulating the composite signal from the extracted signal and for outputting a signal corresponding to a demodulated signal, a driver for actuating said television camera, and a controller for controlling said driver based on the signal outputted from said decoder;

said distributing device including a main circuit portion connected to a transmission line, a plurality of branching circuit portions branching off from said main circuit portion and individually connected to said displaying means, at least one processing circuit having input and output terminals and disposed in one of said main circuit portion and said branching circuit portions, so that the input and output terminals of said processing circuit are disposed at a television camera side and a controlling device side, respectively, said processing circuit outputting the video signal and preventing the control signals from being outputted therefrom, and a plurality of bypass circuits having input and output terminals and connecting across said main circuit portion and said branching circuit portions so as to bypass said processing circuit, so that the input and output terminals of said bypass circuits are disposed at each of the television camera side and the controlling device side, respectively, said bypass circuits outputting the control signals and preventing the video signal from being outputted therefrom.

2. A closed circuit television apparatus according to claim 1, wherein in each of said main circuit portion and said branching circuit portions, said processing circuit is disposed respectively.

3. A closed circuit television apparatus according to claim 1, wherein said processing circuit includes a video signal amplifier which responds to the video signal and does not respond to the control signals and each of the bypass circuits includes a filter which allows the control signals to pass and prevents the video signal from passing.

4. A closed circuit television apparatus according to claim 1, wherein said processing circuit includes a filter which allows the video signal to pass and prevents the control signals from passing, and an amplifier for amplifying the output signal of said filter, and each of the bypass circuits includes a filter which allows the control signals to pass and prevents the video signal from passing, and an amplifier for amplifying the output signal of said filter.

5. A closed circuit television apparatus comprising:

a remote-controllable television camera including an image pick-up device for generating a video signal;

a controlling device including an operating means for generating a plurality of control signals to control said television camera, and a displaying means for receiving the video signal and displaying a picture corresponding to the received video signal; and a compensating device disposed at a transmission line for connecting said displaying means of said controlling device to the television camera so as to compensate the loss of the video signal, outputted from said television camera to the controlling device;

said operating means including a circuit for generating a plurality of composite signals each composed of two signals having different frequencies commensurate with the kind of control, a circuit for generating a carrier signal having a frequency higher than the frequency of the video signal, and a circuit for modulating the carrier signal by the composite signal, and outputting the control signals to a circuit portion connecting said transmission line to said displaying means;

said television camera further including a driving means for receiving the control signals, said driving means including a filter for extracting a modulated carrier signal outputted from said driving means, a decoder for demodulating the composite signal from the extracted signal and for outputting a signal corresponding to a demodulated signal, a driver for actuating said television camera, and a controller for controlling said driver based on the signal outputted from said decoder;

said compensating device including a video signal amplifier which responds to the video signal and does not respond to the control signals and a bypass circuit across the video signal amplifier including a high-pass filter which allows the control signals to pass and prevent the video signal from passing.

6. A closed circuit television apparatus according to claim 5, wherein said compensating device further includes a low-pass filter which allows the video signal to pass to said video signal amplifier and prevents the control signals from passing, and wherein said bypass circuit further includes a control signal amplifier for amplifying the output signal of said high-pass filter 7. A closed circuit television apparatus according to claim 6, wherein said video signal amplifier is a transmitter for transmitting the output signal of said low-pass filter.

8. A closed circuit television apparatus according to claim 6, wherein said video signal amplifier is a receiver for receiving the output signal of said low-pass filter.

9. A closed circuit television apparatus according to claim 6, wherein said video signal amplifier is a relay for relaying the output signal of said low-pass filter.

10. A closed circuit television apparatus comprising;

a remote-controllable television camera including an image pick-up device for generating a video signal;

a control device including an operating means for generating a plurality of control signals to control said television camera through a telephone network, and a displaying means for receiving the video signal and displaying a picture corresponding to the received video signal;

a transmission line extending from said television camera to said displaying means;

a signal processing device disposed at said transmission line for connecting said transmission line to the telephone network to transfer to the television camera the control signals generated by said operating means;

said operating means including a circuit for generating said control signals consisting of a composite signal composed of two signals having different frequencies commensurate with the kind of control, and for sending the composite signal to the television camera through the telephone network;

said signal processing device including an interface connected to the telephone network to receive the control signals, a circuit for decoding the control signals received by the interface and for generating a composite signal composed of two signals having different frequencies commensurate with the decoded control signals, a circuit for generating a carrier signal having a frequency higher than the frequency of the video signal, and a circuit for modulating the carrier signal by the composite signal, and outputting the modulated carrier signal to the transmission line;

said television camera further including a driving means for receiving the control signals, said driving means including a filter for extracting the modulated carrier signal outputted from said driving means, a decoder for demodulating the composite signal from the extracted signal and for outputting a signal corresponding to the demodulated signal, a driver for actuating said television camera, and a controller for controlling said driver based on the signal outputted from said decoder.

* * * * *